United States Patent Office 3,419,598
Patented Dec. 31, 1968

3,419,598
DERIVATIVES OF BICYCLO[2.2.2]OCT-2-ENE AND PROCESS OF PREPARATION
James C. Kauer, Wilmington, Del., assignor to E. I. du Pont de Nemours and Company, Wilmington, Del., a corporation of Delaware
No Drawing. Continuation-in-part of application Ser. No. 377,132, June 22, 1964. This application June 2, 1965, Ser. No. 460,820
15 Claims. (Cl. 260—468)

This is a continuation-in-part of application Ser. No. 377,132, filed June 22, 1964, now abandoned.

This invention relates to new bicyclo[2.2.2]octenes having an aliphatic hydrocarbon substituent and a carboxy or alkoxycarbonyl group on the bridgehead carbon atoms, and to the preparation of these and similar compounds from α-pyrones.

Polycyclic ring compounds have long been known to occur in natural products. Many of such polycyclic compounds, particularly those with fused rings, have physiological applications. Synthesis of many of the ring structures is generally quite difficult, especially of compounds having a plurality of rings common to more than one nuclear carbon.

It has now been found that an α-pyrone of the formula

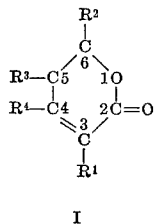

I wherein one of the $R^1$ and $R^2$ substituents is a carboxy group or a lower alkyl ester thereof, i.e., a lower alkoxycarbonyl group, and the remaining $R^1$ or $R^2$ is a $C_1$–$C_8$ saturated hydrocarbyl group, and wherein $R^3$ and $R^4$ each represents hydrogen or a $C_1$–$C_8$ aliphatically saturated hydrocarbyl group, with at least one of $R^3$ and $R^4$ being hydrogen, can be reacted with at least a stoichiometric quantity of ethylene at superatmospheric pressures and at temperatures of about 100–300° C. to yield 4-saturated hydrocarbyl-substituted bicyclo[2.2.2]oct-2-ene-1-carboxylic acids and lower alkyl esters thereof.

The new compounds obtained by the process of this invention can be represented by the structural formula

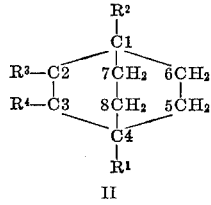

II wherein one of $R^1$ and $R^2$ is a carboxy group (COOH) or a lower alkyl ester thereof (COOR$^5$ in which R$^5$ is lower alkyl, i.e., an alkyl of 1–4 carbon atoms); the other $R^1$ and $R^2$ is a $C_1$–$C_8$ saturated aliphatic hydrocarbyl group; alternately, but equivalently, expressed, $R^1$ and $R^2$ are dissimilar and each is selected from the group consisting of carboxy, and lower alkyl (of 1–4 carbon atoms) esters thereof, and $C_1$–$C_8$ saturated aliphatic hydrocarbyl; and $R^3$ and $R^4$ each represents hydrogen or a $C_1$–$C_8$ hydrocarbyl group free of aliphatic carbon-to-carbon unsaturation, with at least one of $R^3$ and $R^4$ being hydrogen. Preferred are those compounds wherein $R^3$ and $R^4$ are hydrogen and wherein the bridgehead carbon other than that bearing a carboxy group or its ester derivative has a lower alkyl ($C_1$–$C_4$) substituent.

The term "saturated hydrocarbyl," as used throughout the present specification and claims, is synonymous with the term "saturated aliphatic hydrocarbon." This is consistent with accepted chemical naming of organic radicals and includes, e.g., alkyl, cycloalkyl, etc. Thus, the hydrocarbyl groups represented by $R^1$ and $R^2$ in the starting materials and products indicated above can be any radical which is saturated, i.e., free of carbon-to-carbon unsaturation, and which consists solely of hydrogen and 1–8 carbon atoms. The term "aliphatically saturated hydrocarbyl", as used throughout the present specification and claims, to define $R^3$ and $R^4$, is synonymous with the term "aliphatically saturated hydrocarbon", i.e., a hydrocarbon group without aliphatic unsaturation, such as alkyl, cycloalkyl or aryl, and which consists solely of hydrogen and 1–8 carbon atoms.

It is obvious that saturated aliphatic hydrocarbyl groups containing 6 or fewer carbon atoms, preferably 1–4 carbon atoms, are least expensive and most available, and to that extent preferred for $R^1$ and $R^2$. But there is to be no question of the operability of, or of the intent to include and disclose, any such hydrocarbyl group whatsoever as long as it is free of carbon-to-carbon unsaturation and contains 8 or fewer carbon atoms. Illustrative hydrocarbyl groups included within the present invention are acylic alkyl groups such as methyl, ethyl, tertiary butyl, hexyl, octyl, isooctyl, and the like, and cycloalkyl groups such as cycopropyl, cyclobutyl, cyclopentyl, cycohexy, cyclooctyl, dimethylcyclohexyl, ethylcyclohexyl, and the like.

This invention represents a great advance in the art by providing a one-step process for the direct preparation of bicyclooctenes from readily available starting materials. Although the reaction of ethylenically unsaturated compounds with a relatively stable, solid nuclear perchlorinated pyrone has been disclosed (U.S. Patent 3,092,641), the chlorine atoms on the nucleus impart properties which are substantially different from the properties of the products of this invention which employs a non-halogenated pyrone nucleus. Furthermore, in order to obtain the desired product with a nonhalogenated pyrone nucleus, a multi-step synthesis would be required.

The following examples describe various embodiments of the invention in greater detail. It is to be understood that these embodiments do not comprise the entire invention, but are intended rather to be illustrative of a broader inventive concept for which protection by the patent laws is being sought. The invention in its broader context finds supporting disclosure throughout the entire specification, not in the examples alone.

EXAMPLE I

Ethyl 4-methylbicyclo[2.2.2]oct-2-ene-1-carboxylate

A charge of 53 g. of ethyl 6-methyl-α-pyrone-3-carboxylate [prepared by the method described in J. Gen. Chem. USSR, 28, 1562, 2438 (1958)], 1 g. hydroquinone, and 80 ml. of benzene was heated in a pressure vessel with ethylene at 3000 atm. at a top temperature of 180° C. for approximately 10 hours. The pressure vessel was cooled, the gaseous contents carefully vented, benzene removed, and the liquid product distilled to give ethyl 4-methylbicyclo[2.2.2]oct-2-ene-1-carboxylate.

| Fraction | B.P. | Pressure (mm.) | Weight | $n_d^{25}$ |
|---|---|---|---|---|
| 1 | 78–80 | 3.8 | 13.0 | 1.4665 |
| 2 | 80–82 | 3.8 | 6.5 | 1.4665 |
| 3 | 82 | 3.8 | 5.74 | 1.4665 |
| 4 | 82 | 3.8 | 23.0 | 1.4662 |

*Analysis.*—Calcd. (Fraction 3) for $C_{12}H_{18}O_2$: C, 74.19; H, 9.34. Found: C, 74.44; H, 5.0.

Hydrogenation of ethyl 4-methylbicyclo[2.2.2]oct-2-ene-1-carboxylate was effected by use of palladium-on-charcoal catalyst in methanol at about 30 p.s.i. hydrogen pressure to give ethyl 4-methylbicyclo[2.2.2]octane-1-carboxylate, M.P. 22.5–23.5° C. The latter, after refluxing with methanolic sodium hydroxide followed by acidification, gave 4-methylbicyclo[2.2.2]octane-1-carboxylic acid, M.P. 194–195° C.

EXAMPLE II

Addition of ethylene to ethyl 6-ethyl-α-pyrone-3-carboxylate

The general procedure of Example I was repeated except that ethyl 6-ethyl-α-pyrone-3-carboxylate was employed at a time of about 14 hours to give ethyl 4-ethylbicyclo[2.2.2]oct-2-ene-1-carboxylate, B.P. 120–130° C./13 mm.

Hydrogenation of the latter gave ethyl 4-ethylbicyclo[2.2.2]octane carboxylate which after saponification and acidification gave 4-ethylbicyclo[2.2.2]octane-1-carboxylic acid, M.P. 178.5–179.5° C.

EXAMPLE III

Addition of ethylene to ethyl 6-n-propyl-α-pyrone-3-carboxylate

The general procedure of Example II was repeated except that ethyl 6-n-propyl-α-pyrone-3-carboxylate was employed with no added solvent. There was obtained ethyl 4-n-propylbicyclo[2.2.2]oct-2-ene-1-carboxylate, B.P. 112° C./2.2 mm.

Hydrogenation of the latter product gave ethyl 4-n-propylbicyclo[2.2.2]octane-1-carboxylate which after saponification and acidification gave 4-n-propylbicyclo[2.2.2]octane-1-carboxylic acid, M.P. 208–209° C.

*Analysis.*—Calcd. for $C_{12}H_{20}O_2$: C, 73.5; H, 9.9. Found: C, 73.45; H, 9.66.

EXAMPLE IV

Addition of ethylene to ethyl 6-isopropyl-α-pyrone-3-carboxylate

The general procedure of Example II was repeated except that ethyl 6-isopropyl-α-pyrone-3-carboxylate was employed. There was obtained ethyl 4-isopropylbicyclo[2.2.2]oct-2-ene-1-carboxylate, B.P. 120–122° C./6 mm.

Hydrogenation of the latter product gave ethyl 4-isopropylbicyclo[2.2.2]octane-1-carboxylate which after saponification and acidification gave 4-isopropylbicyclo[2.2.2]octane-1-carboxylic acid, M.P. 210–212° C.

EXAMPLE V

Addition of ethylene to ethyl 6-n-butyl-α-pyrone-3-carboxylate

The general procedure of Example II was repeated except that ethyl 6-n-butyl-α-pyrone-3-carboxylate was employed. There was obtained ethyl 4-n-butyl bicyclo[2.2.2]oct-2-ene-1-carboxylate.

Hydrogenation of the latter product gave ethyl 4-n-butylbicyclo[2.2.2]octane-1-carboxylate which after saponification and acidification gave 4-n-butylbicyclo[2.2.2]octane-1-carboxylic acid, M.P. 158–158.5° C.

*Analysis.*—Calcd. for $C_{13}H_{22}O_2$: C, 74.3; H, 10.5. Found: C, 74.11; H, 10.22.

EXAMPLE VI

Addition of ethylene to ethyl 6-tert-butyl-α-pyrone-3-carboxylate

The general procedure of Example II was repeated except that ethyl 6-tert-butyl-α-pyrone-3-carboxylate was used. There resulted ethyl 4-tert-butylbicyclo[2.2.2]oct-2-ene-1-carboxylate.

Hydrogenation of the latter product gave ethyl 4-tert-butylbicyclo[2.2.2]octane-1-carboxylate which after saponification and acidification gave 4-tert-butylbicyclo[2.2.2]octane-1-carboxylic acid, M.P. 281–282.5° C.

*Analysis.*—Calcd. for $C_{13}H_{22}O_2$: C, 74.3; H, 10.5. Found: C, 74.46; H, 10.16.

Ethyl 6-tert-butyl-α-pyrone-3-carboxylate was prepared as follows:

To a stirred mixture of 12 g. (0.5 mole) of sodium hydride in 350 ml. of ethylene glycol dimethyl ether was added a mixture of 50 g. (0.5 mole) of pinacolone and 108 g. (0.5 mole) of diethyl ethoxymethylenemalonate dropwise over a period of 30 minutes. The mixture was refluxed with stirring for 3 hours, then cooled to room temperature. The excess sodium hydride was destroyed with ethanol, and the reaction mixture was poured into a stirred solution of 116 ml. (120 g., 2 moles) of glacial acetic acid in 500 ml. of ice water. This was extracted with ether, the ether extracts were washed with saturated aqueous sodium chloride solution, and they were dried with anhydrous magnesium sulfate. Removal of the ether at reduced pressure gave 132.28 g. of an oil, which on distillation gave 59.13 g., (52%) of ethyl 6-tert-butyl-α-pyrone-3-carboxylate as a yellow oil, B.P. 125° C. at 0.25 mm.; B.P. 130° C. at 0.5 mm.; B.P. 145° C. at 0.8 mm.; B.P. 148° C. at 1.0 mm.

EXAMPLE VII

Addition of ethylene to ethyl 6-methyl-α-pyrone-3-carboxylate

A series of reactions between ethyl 6-methyl-α-pyrone-3-carboxylate and ethylene were carried out at various temperatures and pressures. Each reaction was run for 16 hours in a shaker tube. The reaction product was rinsed from the tube with benzene, and the resultant solution was concentrated to an oil under reduced pressure. The oil was dissolved in ethanol and filtered to remove polyethylene, then the ethanol was removed by vacuum evaporation. In each experiment the removal of the ethanol gave an oil identified as ethyl 4-methylbicyclo[2.2.2]oct-2-ene-1-carboxylate by comparison of its infrared spectrum and behavior in gas chromatography with that of an authentic sample prepared according to Example V. The results of the experiment are summarized in the following table.

| Experiment | Moles of pyrone | Temp. (° C.) | Press. (atm.) | Yield (percent) |
|---|---|---|---|---|
| 1 | 0.525 | 170 | 3,000 | 68 |
| 2 | 0.163 | 200 | 1,000 | *31 |
| 3 | 0.11 | 200 | 1,000 | *35 |
| 4 | 0.11 | 230 | 330 | 66 |
| 5 | 0.11 | 260 | 125 | 79.5 |

*In these runs, accidental spillage occurred, and some product was lost

Using the general process of the preceding examples, when ethyl 4-n-butyl-6-methyl-α-pyrone-3-carboxylate, ethyl 6-cyclohexyl-α-pyrone-3-carboxylate (obtainable by using cyclohexyl carboxylic acid chloride for benzoyl chloride in the procedure of Kochetkov et al., J. Gen. Chem. U.S.S.R. 26, 643 (1956)), ethyl 6-amyl-α-pyrone-3-carboxylate or ethyl 6-heptyl-α-pyrone-3-carboxylate is reacted with ethylene, there is obtained ethyl 2-n-butyl-4 - methylbicyclo[2.2.2]oct-2-ene-1-carboxylate, 4-cyclohexylbicyclo[2.2.2]oct-2-ene-1-carboxylic acid, ethyl 4-amylbicyclo[2.2.2]oct-2-ene-1-carboxylate or ethyl 4-heptylbicyclo[2.2.2]oct-2-ene-1-carboxylate, respectively.

The α-pyrones employed in the aforesaid reactions with ethylene are readily available according to the general methods of Kochetkov et al., J. Gen. Chem. USSR, 26, 643 (1956); 27, 277 (1957); 28, 1562 (1958); Fried and Elderfield, J. Org. Chem. 6, 566 (1941), and Anker and Cook, J. Chem. Soc., 1945, 311, or as generally described in Example VI.

The process of the preceding examples requires pressure equipment since it is conducted at superatmospheric pressures. The exact pressure is dependent upon the compounds employed and may be as high as 5000 atmospheres and above. Generally, it is in the range of 50–3000 atmospheres, and preferably, in the range of 75–1000 atmospheres. The temperature is generally 100–300° C. with temperatures of 125–275° C. being preferred. The time of reaction varies with the exact conditions employed. In general, when it is desired to employ lower pressures, the concurrent use of higher temperatures is preferred to avoid extended reaction times. Generally, times of 0.5–24 hours are used, with 10–20 hours being preferred. Since the reactants employed have carbon-to-carbon double bonds, hydroquinone, phenothiazine, or similar type of free radical inhibitor may be present in small (trace) amounts to prevent side reactions, especially polymerization.

The bicyclooctene carboxylates produced by this reaction are readily isolated by conventional means. Under normal room conditions, they are liquids and have low, but significant, volatility. All the carboxylates thus produced can be converted to the free carboxylic acids by conventional ester hydrolysis reactions.

The new compounds of this invention which have a lower alkyl ester grouping in the $R^1$ or $R^2$ bridgehead position have persistent, pleasant fruit-like odors. Such new compounds are useful in the formulation of perfumes or as flavoring agents where fruity, e.g., grape-like, odors and flavors are desired. This valuable characteristic and resultant utility is in marked contrast to known analogous compounds, such as those wherein $R^2$, $R^3$ and $R^4$ groups all represent hydrogen. These latter compounds give strong unpleasant odors, and accordingly, are quite unsuitable for utilities wherein the compounds of this invention find great value. When carboxy groups are present in both the $R^1$ and $R^2$ positions, the compounds have substantially no odor.

The compounds of this invention are also useful in the preparation of aminobicyclooctanes by conventional reactions involving first, the reduction of the olefinic double bond, and secondly, the conversion of the acid or ester group to an amide group and thence to an amine group. Such aminobicyclooctanes are effective against viral respiratory infections.

Although the process described and exemplified hereinabove is operable for the preparation of the novel compounds having the aforesaid structural Formula II, it has been discovered that the process is useful for the preparation of additional bicyclo[2.2.2]oct-2-enes other than those represented by Formula II. Broadly, by the process of this invention an α-pyrone of the formula

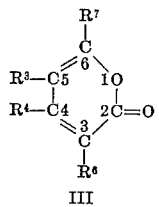

III wherein one of $R^6$ and $R^7$ is a carboxy group or a lower alkyl ester thereof, i.e., a lower alkoxycarbonyl group wherein the alkoxy moiety has 1–4 carbon atoms, and the remaining of $R^6$ and $R^7$ is hydrogen or a $C_1$–$C_8$ saturated hydrocarbyl group, and wherein $R^3$ and $R^4$ each is as previously defined, can be reacted with ethylene, under the conditions as aforesaid, to yield bicyclo[2.2.2]oct-2-ene-1-carboxylic acids or lower alkyl esters thereof having the formula

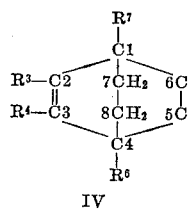

IV wherein $R^3$, $R^4$, $R^6$ and $R^7$ are as defined above. The following examples describe still further embodiments of the process of the present invention.

EXAMPLE VIII

Addition of ethylene to methyl α-pyrone-6-carboxylate

A solution of 11.5 g. of methyl α-pyrone-6-carboxylate (Wiley and Hart, J. Am. Chem. Soc., 76, 1942 [1959]), and 0.1 g. of hydroquinone in 50 ml. of benzene was heated to 150° C. for 14 hours under an ethylene pressure of 3000 atm. Solvent was distilled from the product under reduced pressure, and 50 ml. of methanol was added to the residue to precipitate polymeric materials. The solution was filtered, and the filtrate was distilled under reduced pressure to give methyl bicyclo[2.2.2]oct-2-ene-1-carboxylate. The fraction boiling at 87–89°/20 mm. was collected and weight 9.01 g. (73%), $n_D^{25}=1.4804$. It could be crystallized to a colorless solid melting at 7.0–7.8° C.

Analysis.—Calcd. for $C_{10}H_{14}O_2$: C, 72.76; H, 8.49. Found: C, 72.72, 72.70; H, 8.52, 8.61.

NMR:
τ=3.65 multiplet (2 hydrogens)

6.33 sharp (3 hydrogens) $CH_3O$
7.44 multiplet (1 hydrogen) bridgehead

8.5 multiplet (8 hydrogens) —$CH_2$—$CH_2$—

The product absorbed one mole of hydrogen in the presence of platinum to form methyl bicyclo[2.2.2]octane-1-carboxylate. Saponification of this yielded bicyclo[2.2.2]octane-1-carboxylic acid, M.P. 140.0–141.4° C. The infrared spectrum was identical with that of an authentic sample (Grob, Ohta, Renk, and Weiss, Helv. Chim, Acta 41, 1191 [1958]), prepared by another method.

EXAMPLE IX

Addition of ethylene to ethyl α-pyrone-6-carboxylate

A solution of 30.0 g. of ethyl α-pyrone-6-carboxylate (Wiley and Hart, supra) and 0.1 g. of hydroquinone in 50 ml. of benzene was heated to 150° C. under an ethylene pressure of 3000 atm. for 14 hours. The product was worked up as in Example VIII to yield 22.15 g. (69%) of ethyl bicyclo[2.2.2]oct-2-ene-1-carboxylate, B.P. 96–100° C./10 mm.; $n_D^{25}=1.4746$. Its infrared spectrum was identical with an authentic sample (Grob et al.).

EXAMPLE X

Addition of ethylene to ethyl α-pyrone-3-carboxylate

A solution of 5.3 g. of ethyl α-pyrone-3-carboxylate (Windholz, Peterson, and Kent, J. Org. Chem. 28, 1443 [1963]), in 25 ml. of hexane was heated to 180° C. under an ethylene pressure of 3000 atm. for 17 hours. The product was worked up as in Example IX to yield 2.73 g. (48%) of ethyl bicyclo[2.2.2]oct-2-ene-1-carboxylate whose infrared spectrum was identical with that of the product of Example IX.

EXAMPLE XI

Addition of ethylene to ethyl 4-methyl-α-pyrone-6-carboxylate

A solution of 18.1 g. of ethyl 4-methyl-α-pyrone-6-carboxylate (Higginbotham and Lapworth, J. Chem. Soc. 123, 1325 [1923]), and 0.1 g. of hydroquinone in 50 ml. of benzene was heated to 150° C. under an ethylene pressure of 3000 atm. for 16 hours. The product was worked up as described in the preceding examples to yield 13.97 g. (72%) of ethyl 3-methylbicyclo[2.2.2]oct-2-ene-1-carboxylate, B.P. 86–87.5° C./4.2 mm.; $n_D^{25}=1.4722$.

Analysis.—Calcd. for $C_{12}H_{18}O_2$: C, 74.19; H, 9.34. Found: C, 74.45; H, 9.49.

NMR:

| τ | j, c.p.s. | |
|---|---|---|
| 3.95 | 1.5 | Multiplet (1 hydrogen) =C—H |
| 5.87 | 7 | Quartet (2 hydrogens) —OCH₂—(ester) |
| 7.63 | ---------- | Multiplet (1 hydrogen) bridgehead H |
| 8.21 | 1.5 | Doublet (3 hydrogens) =C—CH₃ |
| 8.48 | ---------- | Symmetrical (8 hydrogens) —CH₂—CH₂— multiplet. |
| 8.77 | 7 | Triplet (3 hydrogens) ester CH₃ |

The ester was saponified with aqueous ethanolic sodium hydroxide followed by acidification to give 3-methylbicyclo[2.2.2]oct-2-ene-1-carboxylic acid, M.P. 108–108.7° C.

Analysis.—Calcd. for $C_{10}H_{14}O_2$: C, 72.26; H, 8.49. Found: C, 72.46; H, 8.52.

A solution of 13.7 g. (0.0705 mole) of ethyl 3-methylbicyclo[2.2.2]oct-2-ene-1-carboxylate in 50 ml. of ethanol was hydrogenated at 40 p.s.i. using 0.2 g. of platinum oxide catalyst. A total of 0.071 mole of hydrogen was absorbed. The hydrogenation was repeated with an additional 9.8 g. of ester. The combined products were filtered and distilled to yield 21.5 g. of ethyl 3-methylbicyclo[2.2.2]octane-1-carboxylate, B.P. 75–77° C./4.0 mm.; $n_D^{25} = 1.4661$.

Analysis.—Calcd. for $C_{12}H_{20}O_2$: C, 73.43; H, 10.27. Found: C, 73.49; H, 10.15.

The ester was saponified to yield 3-methylbicyclo[2.2.2]octene-1-carboxylic acid, M.P. 92.8–93.5° C.

Analysis.—Calcd. for $C_{10}H_{16}O_2$: C, 71.39; H, 9.59. Found: S, 71.72; H, 9.52.

EXAMPLE XII

Addition of ethylene to α-pyrone-6-carboxylic acid

In a series of experiments a mixture of α-pyrone-6-carboxylic acid (Wiley and Hart, supra) and benzene was prepared and in one case 0.1 g. hydroquinone was added. The mixture was heated under ethylene pressure as shown in the table. The mixture was cooled and filtered. (When solid was present, the mixture was diluted with acetone to facilitate filtration.) Solvent was removed under reduced pressure, and the residual solid was dissolved in excess 3 N sodium hydroxide solution. The solution was filtered, extracted three times with ether (discarded) and was acidified with hydrochloric acid. In all three experiments the resulting whitish solid was shown by infrared spectroscopy to be essentially pure bicyclo[2.2.2]oct-2-ene-1-carboxylic acid. After sublimation the product from experiment A melted at 112–116° C.

| Experiment | A | B | C |
|---|---|---|---|
| Solvent (benzene), ml | 20 | 50 | 50 |
| Wt. α-pyrone-6-carboxylic acid (g.) | 10.3 | 10.0 | 10.0 |
| Wt. hydroquinone added (g.) | 0.1 | None | None |
| Temperature (° C.) | 180 | 165 | 180 |
| Ethylene pressure (atm.) | 3000 | 960 | 350 |
| Time (hours) | 15 | 16 | 14 |
| Weight product (g.) | 6.9 | 6.88 | 8.67 |
| Percent yield | 62 | 63 | 80 |

Using the general process of the immediately preceding examples, when 5-methyl-α-pyrone-6-carboxylic acid, methyl 5-methyl-α-pyrone-6-carboxylate or 5-ethyl-α-pyrone-6-carboxylic acid, is reacted with ethylene, there is obtained 2-methylbicyclo[2.2.2]oct-2-ene-1-carboxylic acid, methyl 2-methylbicyclo[2.2.2]oct-2-ene-1-carboxylate or -ethylbicyclo[2.2.2]oct-2-ene-1-carboxylic acid respectively.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

I claim:

1. The class of compounds having the formula

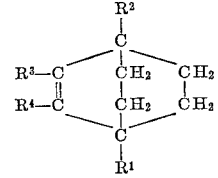

wherein one of $R^1$ and $R^2$ is selected from the group consisting of carboxy and lower alkoxycarbonyl and the other of $R^1$ and $R^2$ is a $C_1$–$C_8$ saturated aliphatic hydrocarbyl group, and $R^3$ and $R^4$ each is selected from the group consisting of hydrogen and a $C_1$–$C_8$ hydrocarbyl group free of aliphatic carbon-to-carbon unsaturation, with the proviso that at least one of $R^3$ and $R^4$ is hydrogen.

2. The class of compounds of claim 1 wherein one of $R^1$ and $R^2$ is carboxy, the other of $R^1$ and $R^2$ is a $C_1$–$C_4$ alkyl group and $R^3$ and $R^4$ are hydrogen.

3. The class of compounds of claim 1 wherein one of $R^1$ and $R^2$ is lower alkoxycarbonyl, the other of $R^1$ and $R^2$ is a $C_1$–$C_4$ alkyl group and $R^3$ and $R^4$ are hydrogen.

4. Ethyl 4-methylbicyclo[2.2.2]oct-2-ene-1-carboxylate.
5. Ethyl 4-ethylbicyclo[2.2.2]oct-2-ene-1-carboxylate.
6. Ethyl 4-n-propylbicyclo[2.2.2]oct-2-ene-1-carboxylate.
7. Ethyl 4-isopropylbicyclo[2.2.2]oct-2-ene-1-carboxylate.
8. Ethyl 4-n-butylbicyclo[2.2.2]oct-2-ene-1-carboxylate.
9. Ethyl 4-t-butylbicyclo[2.2.2]oct-2-ene-1-carboxylate.
10. The process of preparing bicyclo[2.2.2]oct-2-enes having the formula

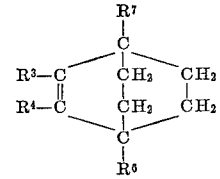

wherein $R^3$ and $R^4$ each is selected from the group consisting of hydrogen and a $C_1$–$C_8$ hydrocarbyl group free of aliphatic carbon-to-carbon unsaturation, with the proviso that at least one of $R^3$ and $R^4$ is hydrogen, and wherein one of $R^6$ and $R^7$ is selected from the group consisting of carboxy and lower alkoxycarbonyl and the other of $R^6$ and $R^7$ is selected from the group consisting of hydrogen and a $C_1$–$C_8$ saturated aliphatic hydrocarbyl group, which comprises the steps of reacting, at a pressure in the range of 50–3000 atm. and at a temperature in the range of 100–300° C., at least a stoichiometric quantity of ethylene with an α-pyrone having the formula

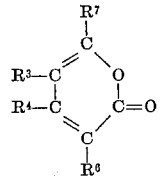

wherein $R^3$, $R^4$, $R^6$ and $R^7$ are as defined above, and thereafter separating from the reaction mixture by conventional means said bicyclo[2.2.2]oct-2-ene wherein each $R^3$, $R^4$, $R^6$ and $R^7$ is the same as in the reactant α-pyrone.

11. The process of claim 10 wherein the pressure is in the range of 75–1000 atm. and the temperature is in the range of 125–275° C.

12. The process of claim 10 wherein one of $R^6$ and $R^7$ is lower alkoxycarbonyl, the other of $R^6$ and $R^7$ is a $C_1$–$C_4$ saturated aliphatic hydrocarbyl group and $R^3$ and $R^4$ are hydrogen.

13. The process of claim 10 wherein one of $R^6$ and $R^7$ is lower alkoxycarbonyl and the other of $R^6$ and $R^7$ and $R^3$ and $R^4$ are hydrogen.

14. The process of claim 10 wherein one of $R^6$ and $R^7$ is carboxy, the other of $R^6$ and $R^7$ is a $C_1$–$C_4$ saturated aliphatic hydrocarbyl group and $R^3$ and $R^4$ are hydrogen.

15. The process of claim 10 wherein one of $R^6$ and $R^7$ is carboxy and the other of $R^6$ and $R^7$ and $R^3$ and $R^4$ are hydrogen.

References Cited

UNITED STATES PATENTS

| 3,081,334 | 3/1963 | Kauer | 260—468 |
| 3,092,641 | 6/1963 | Leon | 260—343.2 |

OTHER REFERENCES

Diels et al.: Ann. 490, 257–9 (1931).
Roberts et al.: J. Am. Chem. Soc. 75, 637 (1953).
Zimmerman et al.: J. Am. Chem. Soc. 82, 1514 (1960).

LORRAINE A. WEINBERGER, *Primary Examiner.*

P. J. KILLOS, *Assistant Examiner.*

U.S. Cl. X.R.

260—514